Patented Aug. 23, 1932

1,873,630

UNITED STATES PATENT OFFICE

ADOLF PFANNENSTIEL, OF BERLIN-LICHTENRADE, GERMANY, ASSIGNOR TO WINTHROP CHEMICAL COMPANY, INC., OF NEW YORK, N. Y., A CORPORATION OF NEW YORK

MANUFACTURE OF A VANILLIN AND 3-ETHOXY-4-HYDROXYBENZALDEHYDE

No Drawing. Application filed December 8, 1931, Serial No. 579,826, and in Germany January 26, 1931.

My present invention relates to a new process of manufacturing 3-methoxy-4-hydroxybenzaldehyde (vanillin) and 3-ethoxy-4-hydroxybenzaldehyde.

3-methoxy-4-hydroxyphenyltrichlor-methylcarbinol (trichlormethylguaiacylcarbinol) which is easily accessible (cf. "Berichte der Deutschen Chemischen Gesellschaft", vol. 56, page 982) already has been suggested to be used as a starting material in the manufacture of vanillin. As described in U. S. Patent No. 1,536,732, in accordance with Savariau ("Chemisches Zentralblatt", 1908 I, page 1388) the said carbinol behaves quite differently from phenyltrichlormethylcarbinol; whereas the latter, when boiled with potassium carbonate, is decomposed so as to form benzaldehyde and chloroform, the 3-methoxy-4-hydroxyphenyltrichlormethylcarbinol when treated in the same manner, does not show even the slightest formation of vanillin and chloroform. This process could, therefore, not be used for preparing vanillin, so that it was necessary to adopt the more complicated and expensive oxidation method which is the object of U. S. Patent No. 1,536,732.

According to this invention, 3-methoxy-4-hydroxybenzaldehyde and 3-ethoxy-4-hydroxybenzaldehyde are obtainable with a good yield by treating 3-methoxy-4-hydroxytrichlormethylcarbinol or 3-ethoxy-4-hydroxytrichlormethylcarbinol with an alkali metal alcoholate or an alcoholic solution of an alkali metal hydroxide or an alkaline-earth metal hydroxide. A strong reaction is produced by which the corresponding vanillin salt is obtained, which on acidification yields free vanillin or 3-ethoxy-4-hydroxybenzaldehyde respectively in a very good yield. This smooth reaction, certainly, could not be foreseen, since 3-methoxy- and 3-ethoxy-4-hydroxytrichlormethylcarbinol are known to be particularly sensible on account of their particular substitution. If, nevertheless, the reaction takes a favorable course, this is probably due to the acid nature of the hydroxy group which allows a stable alkali salt to be formed. The reaction now takes place with an alcoholic alkali in such a way that an oxygen bridge is first produced which is bound in a glycide-like manner. In the case of vanillin the reaction probably takes place according to the following scheme:

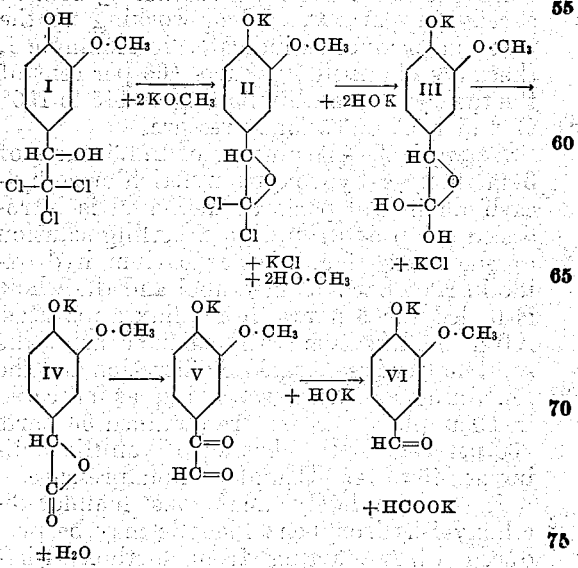

If the reaction is conducted with an aqueous alkali the glycide-like compound represented in Formula II is evidently not formed. In this case, uncontrollable reactions lead to dark-brown smears.

The following examples illustrate the invention without limiting it to the specific details given therein, the parts being by weight:

*Example 1.*—A solution of 271.5 parts of 3-methoxy-4-hydroxyphenyltrichlormethyl-carbinol (about 90%) in 240 parts of methanol is added to a solution of 69 parts of sodium is 2400 parts of methanol. The solution is boiled in a reflux apparatus for 4 hours and acidified with sulfuric acid or another mineral acid; the methanol is then expelled by means of steam and the solution is exhaustively extracted with chloroform. On distillation in a vacuum, 84 parts, that is 60% of the theory, of vanillin are obtained, boiling at 140 to 145° C. under 6 mm. pressure.

*Example 2.*—A solution of 271.5 parts of 3-methoxy-4-hydroxyphenyltrichlormethylcarbinol in 650 parts of ethanol is added to a solution of 270 parts of potassium hydroxide (90% strength) in 650 parts of ethanol. By the reaction heat evolved the solution which at the beginning has a temperature of 20° C. is brought to boiling temperature in the course of 1½ hours. After the reaction has ceased, the whole is kept boiling for another ½ hour and the product is worked up as indicated in Example 1. The vacuum distillation yields 69 parts (corresponding to 46% of the theory of vanillin boiling at 145 to 152° C. under 6.5 mm. pressure.

*Example 3.*—A solution of 271.5 parts of 3-methoxy-4-hydroxyphenyltrichlormethylcarbinol in 480 parts of methanol is added at a temperature of about 20° C. to a solution of 270 parts of potassium hydroxide in 480 parts of methanol. The reaction immediately sets in with violent boiling; after it has ceased boiling is continued for a further ½ hour in a reflux apparatus. When working up the reaction product as indicated in Example 1, there are obtained 101 parts (66 per cent of the theory) of vanillin boiling at 145 to 150° C. under 5.5 to 6.5 mm. pressure.

*Example 4.*—A solution of 271.5 parts of 3-methoxy-4-hydroxyphenyltrichlormethylcarbinol in 240 parts of methanol is introduced, drop by drop, into a boiling solution of 450 parts of anhydrous barium hydroxide in 2000 parts of methanol and the whole is boiled for 6 hours in a reflux apparatus. After acidification with sulfuric acid, the solid matter is separated by filtration and the remaining solution is worked up as indicated in Example 1. There are obtained 96 parts (63 per cent of the theory) of vanillin boiling at 145 to 149° C. under 6 mm. pressure.

In a completely analogous manner 3-ethoxy-4-hydroxybenzaldehyde may be produced when starting from 3-ethoxy-4-hydroxytrichlormethylcarbinol as seen from the following example.

*Example 5.*—A solution of 285.5 parts of 3-ethoxy-4-hydroxyphenyltrichlormethylcarbinol containing 65 per cent of pure substance in 400 parts of methanol is run within 30 minutes into a boiling solution of 375 parts of potassium hydroxide containing 90 per cent of KOH in 1200 parts of methanol. Boiling is continued for another three hours in a reflux apparatus, whereafter the solution is acidified with a dilute mineral acid and exhaustively extracted with chloroform. By distilling under reduced pressure there are obtained 118 parts of 3-ethoxy-4-hydroxybenzaldehyde corresponding to 72 per cent of the theory.

In the place of the potassium hydroxide the equivalent quantity of sodium hydroxide or an alkali earth metal hydroxide or of a mixture of sodium hydroxide and potassium hydroxide may be utilized with the same good result.

This may be seen from the following example:

*Example 6.*—271.5 parts of 3-methoxy-4-hydroxyphenyltrichlormethylcarbinol (the raw product as obtainable by condensing guaiacol with chloral and containing about 90% of the said carbinol) are dissolved in about 500 parts of methanol and a solution of 180 parts of sodium hydroxide (90%) and potassium hydroxide (90%) in 2500 parts of methanol is slowly added. The reaction is performed as described in the foregoing examples. When working up the reaction mixture in the manner described, 112 parts of vanillin are obtained.

What I claim is:—

1. The process which comprises treating an alkoxyhydroxyphenyltrichlormethylcarbinol of the general formula:

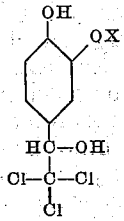

wherein X means methyl or ethyl, with a saponifying agent of the group consisting of alkali metal alcoholates and alcoholic solutions of alkali metal hydroxides and alkaline-earth metal hydroxides, and acidifying the reaction mixture.

2. The process which comprises treating an alkoxyhydroxyphenyltrichlormethylcarbinol of the general formula:

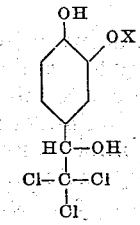

wherein X means methyl or ethyl, with an alcoholic solution of an alkali metal hydroxide, and acidifying the reaction mixture.

3. The process which comprises treating an alcoholic solution of 3-methoxy-4-hydroxytrichlormethylcarbinol with potassium hydroxide of about 90 per cent strength dissolved in methanol, and acidifying the reaction mixture.

4. The process which comprises treating an alcoholic solution of 3-ethoxy-4-hydroxytrichlormethylcarbinol with potassium hydroxide of about 90 per cent strength dissolved in methanol, and acidifying the reaction mixture.

5. The process which comprises treating an alcoholic solution of 3-methoxy-4-hydroxytrichlormethylcarbinol with a mixture of potassium hydroxide and sodium hydroxide of about 90 per cent strength dissolved in methanol, and acidifying the reaction mixture.

In testimony whereof I affix my signature.

ADOLF PFANNENSTIEL.